(12) United States Patent
Golomb et al.

(10) Patent No.: US 7,280,663 B1
(45) Date of Patent: Oct. 9, 2007

(54) ENCRYPTION SYSTEM BASED ON CROSSED INVERSE QUASIGROUPS

(75) Inventors: Solomon W. Golomb, La Canada, CA (US); Lloyd R. Welch, La Canada, CA (US); József Dénes, Budapest (HU)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 09/576,598

(22) Filed: May 22, 2000

(51) Int. Cl.
*H04L 9/00* (2006.01)

(52) U.S. Cl. .................... 380/277; 380/30; 380/28; 380/255; 713/168; 713/170

(58) Field of Classification Search ............... 380/255, 380/28–29, 2–4, 23, 49–50, 25–26, 42, 9, 380/21; 341/55, 80, 51
See application file for complete search history.

(56) References Cited

U.S. PATENT DOCUMENTS

| | | | | |
|---|---|---|---|---|
| 4,218,582 A | * | 8/1980 | Hellman et al. | 380/30 |
| 4,424,414 A | * | 1/1984 | Hellman et al. | 380/30 |
| 5,440,640 A | * | 8/1995 | Anshel et al. | 380/46 |
| 5,724,427 A | * | 3/1998 | Reeds, III | 380/259 |
| 5,787,173 A | * | 7/1998 | Seheidt et al. | 380/277 |
| 5,812,072 A | * | 9/1998 | Masters | 341/55 |
| 5,850,450 A | * | 12/1998 | Schweitzer et al. | 380/30 |
| 5,982,890 A | * | 11/1999 | Akatsu | 707/200 |
| 6,266,417 B1 | * | 7/2001 | Scheidt et al. | 380/255 |

OTHER PUBLICATIONS

Koscielny, C. "A method of constructing quasigroup-based stream-ciphers." Appl. Math. And Comp. Sci., vol. 6, No. 1, pp. 109-121 (1996).
Koscielny, C. et al. "A quasigroup-based public-key cryptosystem." Int. J. Appl. Math And Comp. Scit, vol. 9, No. 4, pp. 955-963 (1999).

* cited by examiner

*Primary Examiner*—Charles Rones
*Assistant Examiner*—Belix M. Ortiz
(74) *Attorney, Agent, or Firm*—Fish & Richardson P.C.

(57) ABSTRACT

Encryption is carried out based on a non field, non group algebraic structure. Preferably the algebraic structure is at least one of non-associative or non-commutative. An embodiment is described in which the algebraic structure is a crossed inverse quasigroup. A crossed inverse quasigroup can be a very large quasigroup e.g. of size $10^{10}$. Either the quasigroup itself, or rules for calculating the values in the quasigroup can be distributed.

28 Claims, 2 Drawing Sheets

ENCRYPTION SYSTEM BASED ON CROSSED INVERSE QUASIGROUPS

BACKGROUND

The present invention teaches a cryptology system using mathematical structures including crossed-inverse quasigroups or similar mathematical structures.

Cryptosystems often use a mapping, f, from the plaintext message segment, M, to a ciphertext segment, C. A parameter E is the cryptographic enciphering "key". Here f is the enciphering algorithm that generates C from M and E. Thus, C=f(M,E).

The message is decrypted according to a mapping g using a decryption parameter. D is the deciphering key, which may or may not be the same as the enciphering key E, and g is the deciphering algorithm that recovers the original message M from the received enciphered message C and the deciphering key D. Hence M=g(C,D). In a stream cipher, these can be "small" functions. The message is divided into segments, $M_k$, and a stream of key, $E_k$, is generated.

The sender computes the stream $C_k$=f($M_k$, $E_k$)

The recipient generates or stores the stream Dk and decodes $M_k$=g($C_k$, $D_k$).

Many times, the cryptological algorithms are made public. The security against unauthorized reception is in the key stream, $E_k$. The mutual information between $M_k$ and $E_k$ should be sufficiently small that the message cannot be determined by statistical methods. Alternately, the space from which $E_k$ is selected can be too large to be searched.

For a public key system, the objects are from very large sets, e.g., 128 bits which has $2^{128} \approx 3.4 \times 10^{38}$ elements in the set.

The public knows the function f. The encryption key, E, is distributed. A message sender computes and transmits C =f(M, E), and transmits E if it is randomly generated. In this case, the owner of the system also has g and either has D or has an algorithm to generate D from E. The owner then computes g(C, D) to recover M.

The security of such a system is based on the difficulty of inverting the function f, without additional information that is known only to the owner.

Nearly all public key cryptosystems are based on finite algebra which is both associative and commutative. The associative property can be described as (a ∘b)∘c=a ∘(b ∘c), where ∘ means any associative arithmetic operation for all a, b, and c in the algebra. The commutative property also holds that a ∘b=b ∘a for all a and b in the algebra.

The kind of algebra used in existing systems includes, for example, 1) integer arithmetic, modulo an integer, 2) finite fields, and 3) the arithmetic of elliptic curves. All of these are associative and commutative algebras.

An associative arithmetic operation has the property that serial encryption using that operation results in no more security than a single encryption. Two successive 64-bit encryptions, for example, use 128 bits, but in associative arithmetic this is merely equivalent to another 64 bit encryption.

SUMMARY

This invention describes an encryption system using a technique which is, in general, not associative or not commutative or neither associative nor commutative.

A disclosed mode uses "crossed-inverse quasigroups" for encryption.

BRIEF DESCRIPTION OF THE DRAWINGS

These and other aspects of the invention will now be described with reference to the attached drawings, in which.

DETAILED DESCRIPTION

Figure 1:
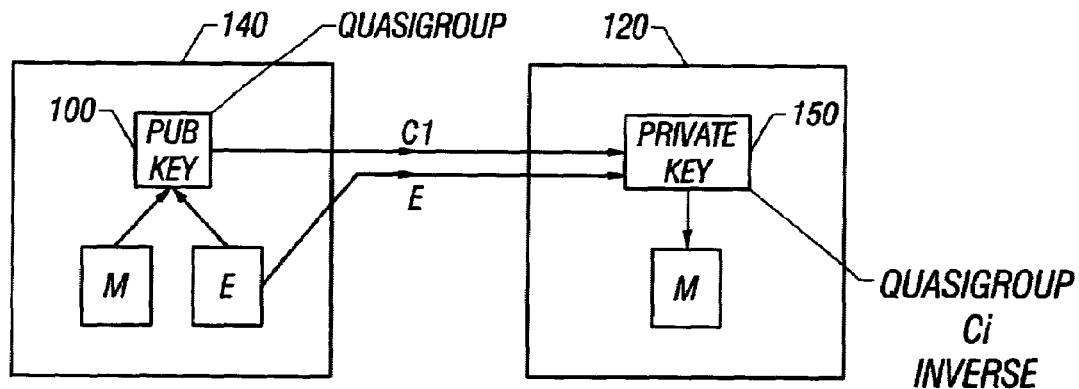
FIG. 1 shows a circuit used for the encryption.

A quasigroup is a set of objects with a multiplication table described by a latin square of size n×n using n distinct symbols which has certain characteristics described herein. In a latin square, each of the n symbols appears once and only once in each row and in each column. For n>=5, there are a very large number of latin squares and therefore of quasigroups. The number of distinct latin squares, and therefore of inequivalent quasigroups, for n=10, is known to be 7,580,721,483,160,132,811,489,280, or $7.58 \times 10^{24}$. For n>=11, the exact number of possible quasigroups is unknown. At n=14, the number of inequivalent quasigroups is estimated to be about $2.33 \times 10^{70}$.

A quasigroup which is associative is, by definition, a group. The number of groups of order n (i.e. with n distinct elements) is very small compared to the number of quasigroups of order n, except for very small n, e.g. for n<=4, where the number of quasigroups is not yet very large. The ratio of the number of groups to the number of quasigroups tends to zero as the size thends to infinity.

For example, there is only one group of n elements when n=1, 6, 7, 9, 11, 13, 14, 17, 19, 23, 29, and for infinitely many larger values of n. For each n<=30, the number of distinct commutative groups with n elements is fewer than six.

If n is the number of elements in the quasigroup, then, in principle, a multiplication table can be formed by an n by n array indexed by the elements, a ∘b =L(a,b), where L represents a latin square. A latin square has the property that the elements in each row and in each column are a permutation (rearrangement) of the elements of the quasigroup. For the "row" property of the latin square, this is equivalent to the statement that for each pair (a, b) the equation a ∘x =b has exactly one solution for x. Analogously, the "column" property says that for each pair (a, b), the equation y ∘a =b has exactly one solution for y.

The notation "a ∘b" indicates whatever rule of combining a and b is used in the quasigroup. In special cases, "∘" could be a plus-sign or a times-sign, both of which are normally used to indicate associative operations. In general, however, there need be no specific interpretation of the operation indicated by a ∘b other than what is shown in the "quasigroup table" itself.

This lack of any other interpretation of the symbol, and its failure to obey familiar rules like the associative and commutative rules, makes the disclosed system unusually difficult for a cryptanalyst adversary. In practice, the operation can be defined by a "rule" to make the calculation feasible, even when the quasigroup is too large to store in a memory.

A crossed-inverse quasigroup (ci-quasigroup) has an additional requirement, or property, beyond those described above for a quasigroup. For each element, a, in the ci-quasigroup, there exists another element, a', such that a'∘(M ∘a)=M for all M in the quasigroup. The relation between a and a' is a permutation, a'=π(a). This permutation is called the ci-permutation. Put a different way, operating on the left with a' undoes the result of having operated on the right with a. That is, to recover M after M ○a has been computed, (M ○a) is operated from the left with a' to get a'○(M ○a) =M.

The algorithm for the ci-permutation can be computed rather than stored, to facilitate the use of very large ci-quasigroups.

A trivial crossed-inverse quasigroup is one for which the ci-permutation, π, has the property, π(π(x))=x. All others are called non-trivial.

A group G is any collection of objects a,b,c, . . . with an operation "*" such that a*b is again in G whenever a and b are in G; where a*(b*c) =(a*b)*c for all a, b, and c (not necessarily distinct) in G; where there is an element e in G with e*a =a*e =a for every a in G; and where, for each a in G there is an "inverse" $a^{-1}$ such that $a^{-1}*a =e =a*a^{-1}$. There is a vast mathematical literature about groups.

Every group is a quasigroup, but not every quasigroup is a group. Hence, groups are a special subset of the universe of quasigroups. Unlike groups, quasigroups are not required to obey the associative rule a*(b*c)=(a*b)*c for all a, b, and c. Those quasigroups which are not groups are referred to herein as non-group quasigroups.

Those groups which are also crossed-inverse quasigroups must be commutative and have $π(a)=a^{-1}$. That is, the ci-permutation in this case is merely the mapping from elements to their multiplicative inverses. If we iterate the mapping, π(π(a)), we get a. That is, two applications of the ci-permutation gives the "identity permutation" when working in a group.

The disclosed mode uses non-trivial, non-group ci-quasigroups as the basis for encryption. The requirement of non-triviality excludes the use of groups, so only quasigroups which are not groups can be used. For use in public-key cryptography, the possessor of the public key publishes an algorithm to compute a ○b in the ci-quasigroup, e.g by distributing mathematical information indicating the latin square of the quasigroup. The possessor keeps secret the ci-permutation, B.

The operation is shown and described with reference to FIGS. 1 and 2.

The first step is to find a non-trivial, non group, ci quasigroup, and its ci-permutation, to use as a key. One way to do this is as follows. Let G be any commutative group of n elements, where n+1 is a composite number, i.e. n+1=rs, where r and s are both integers greater than 1. The group operation in G can be represented by juxtaposition, so that the "product" in G of two of its elements, x and y, is denoted by xy. Define a new operation "○" on the elements of G by the relation a○b=$a^r b^s$. Then the elements of G with the operation ○ form a ci- quasigroup, where the right crossed inverse of the element a is $a^u$, where $u=(-r)^3$. The ci-permutation for this quasigroup will depend on which commutative group G is used. The quasigroup Q is distributed as the public part of the key. The ci-permutation is kept secret.

For security, the quasigroup Q should have an n at least $10^{10}$, and often much larger.

For use in a stream cipher, the sender breaks up the message to be sent into fixed size blocks of T symbols each, where a symbol is a short segment of message, $\{M_t: 1 \le t \le T\}$, generates the key, $\{E_t: 1 \le t \le T\}$, which is often a random session key, and uses the ci-quasigroup to produce ciphertext, $\{C_t: 1 \le t \le T\}$, as follows:

$C_t = M_t ○ E_t$.

The number of possible symbols must be sufficiently large to make an exhaustive search infeasible.

The sender transmits both the key and the ciphertext, ($E_t$, $C_t$). The intended receiver knows the ci-permutation. The receiver uses the ci-permutation and the permuted key sequence, $\{D_t = B\{E_t\}: 1 \le t \le T\}$ to decipher the message as follows:

$M_t = D_t ○ C_t = D_t ○ (M_t ○ E_t)$.

The security lies in the distinction between the encipherment key and the decipherment key. An interceptor has C and E. However, solving the equation C=M ○E is equivalent to finding the ci-permutation, which is an exceedingly difficult task for large n. That is, for sufficiently large ci-quasigroups, the cryptanalyst will not be able to decode the ciphertext without knowing the crossed-inverse of E. The size of the ci-quasigroup is made large enough that it is not feasible to search for D.

Figure 2:
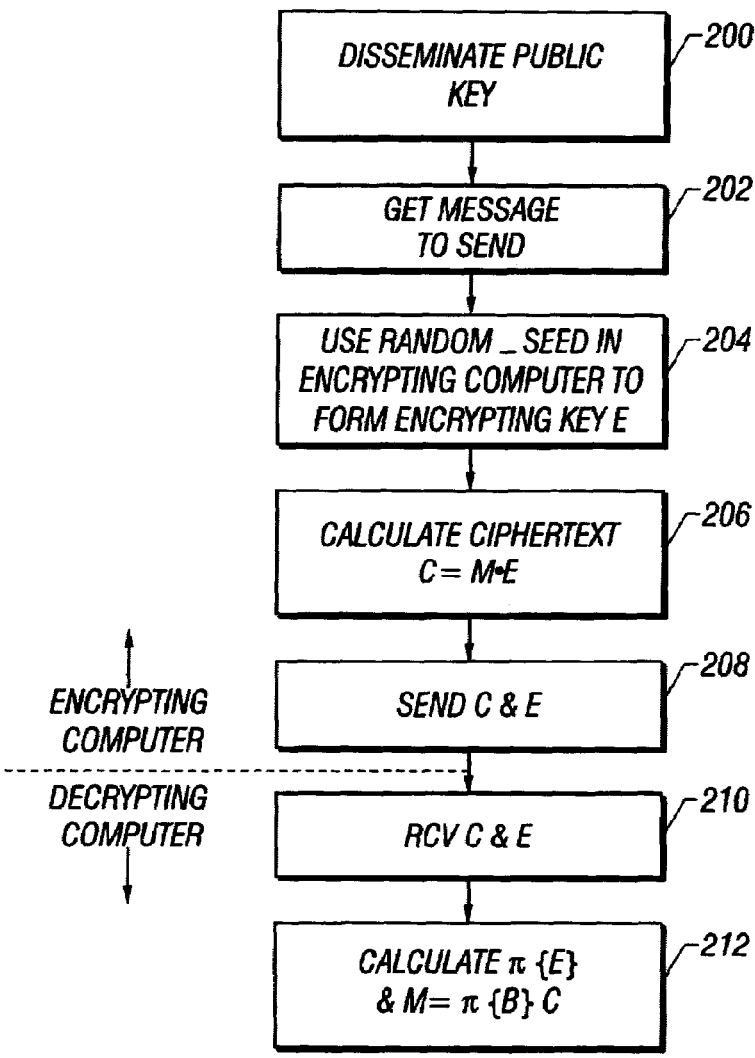
FIG. 2 shows a flowchart of a disclosed mode.

FIG. 2 shows a flowchart of operation. A "public" key is distributed at 200. That public key is not necessarily the ci-quasigroup, but only a rule or procedure for calculating "products". The private key is the "quasi-inverse" rule, which is not publicly disclosed. The fact that the product rule is that of a ci-quasigroup could also be kept secret if desired.

The user then gets a message to send at 200, and uses a random seed at 204 to form an encrypting key E. The encrypting key E is used to form cyphertext C=M ○E at 206, and C and E are sent at 208.

As added security, the sender could also be provided with another encryption key E* which is used to encipher E so that the sender sends C=M ○E and {E o E*}. The receiver uses π{E *} to recover E and π{E} to recover M. In all of this, the basic principle is that knowing the encryption key does not aid an interceptor's decipherment problem, because the decryption key is different from the encryption key.

FIRST EXAMPLE

This simple example is presented only to illustrate the encryption/decryption calculations and is not intended as a working system. Let the ci-quasigroup have the following "multiplication table":

| 0 | 0 | 1 | 2 | 3 | 4 | 5 | 6 "col"- |
|---|---|---|---|---|---|---|---|
| 0 | 3 | 0 | 6 | 4 | 2 | 5 | 1 |
| 1 | 2 | 4 | 1 | 0 | 5 | 3 | 6 |
| 2 | 0 | 3 | 5 | 2 | 1 | 6 | 4 |
| 3 | 5 | 1 | 4 | 6 | 3 | 2 | 0 |
| 4 | 1 | 6 | 2 | 5 | 0 | 4 | 3 |
| 5 | 4 | 2 | 0 | 3 | 6 | 1 | 5 |
| 6 | 6 | 5 | 3 | 1 | 4 | 0 | 2 |

The ci-permutation for this quasigroup is

| a | 0 | 1 | 2 | 3 | 4 | 5 | 6 |
|---|---|---|---|---|---|---|---|
| B(a) | 1 | 2 | 3 | 4 | 5 | 6 | 0 |

Suppose the sender wishes to send '1' as the message and use encipher key '5'. Then from the table entry with row index 1 and column index 5, we obtain 3, (1 ○ 5 =3), so the ciphertext is '3'. The sender sends C=3 and E=5.

Now the recipient applies the ci-permutation to the encipher key, 5, to get D=π(5)=6. The recipient then computes D ○C =6 ○3. This is the entry with row index 6 and column index 3. This entry is '1' (6 ○3=1), which is the original message.

SECOND MORE ELABORATE EXAMPLE

An example using all letters of the alphabet plus some punctuation would require an unwieldy table for this presentation, so this example uses twelve letters of the alphabet, {A, E, F, G, H, I, M, N, O, R, S, T} along with a word separator, *, to give a thirteen by thirteen multiplication table. Again, this example is intended as a simplified illustration. The reduced alphabet size as shown below is far too small to withstand an exhaustive attack. The encryption system is described with reference to FIGS. 1 and 2. In this example, the ci-quasigroup multiplication table is

| 0 | * | A | E | F | G | H | I | M | N | O | R | S | T |
|---|---|---|---|---|---|---|---|---|---|---|---|---|---|
| * | E | T | I | R | A | * | O | M | G | N | S | F | H |
| A | I | F | * | M | S | E | A | R | N | H | O | T | G |
| E | H | M | G | A | N | T | F | E | S | O | I | R | * |
| F | A | I | N | H | E | O | * | G | F | T | R | M | S |
| G | T | E | M | O | I | F | R | A | H | C | * | S | N |
| H | O | * | F | N | R | M | G | S | E | I | H | A | T |
| I | * | R | A | G | O | S | N | H | T | F | M | I | E |
| M | F | A | S | E | H | R | T | O | I | * | G | N | M |
| N | N | G | E | T | F | I | S | * | R | M | A | H | O |
| O | R | O | H | F | * | G | M | T | A | S | N | E | I |
| R | M | S | R | I | C | A | H | N | * | E | T | O | F |
| S | G | N | T | S | M | H | E | I | O | A | F | * | R |
| T | S | H | O | * | T | N | I | F | M | R | E | G | A |

In the disclosed example, this is the "public" key 100. The system of FIG. 1 describes the computer operates according to the flowchart of FIG. 2, by first disseminating the public key 100 at 200.

The ci-permutation for this quasigroup is

| a | * | A | E | F | G | H | I | M | N | O | R | S | T |
|---|---|---|---|---|---|---|---|---|---|---|---|---|---|
| π(a) | A | E | F | G | H | I | M | N | O | R | S | T | * |

Suppose we wish to send the message

A*MESSAGE*FOR*AGENTS

At step 202 this is sent from the encrypting circuit 110, to the decrypting circuit 120 that stores the private key 150. A random seed (variable RANDOM_SEED) is stored in the encrypting circuit 110. This is used to create a random encrypting key that is within the allowable alphabet. For this simple example, the encrypting key E is AEFGHIMNO-RAEFGHIMNOR.

The ciphertext C is calculated at 206, in the encrypting circuit.

The computation of the ciphertext, C, is the following:

| M | A | * | M | E | S | S | A | G | E | * | F | O | R | * | A | G | E | N | T | S |
|---|---|---|---|---|---|---|---|---|---|---|---|---|---|---|---|---|---|---|---|---|
| E | A | E | F | G | H | I | M | N | O | R | A | E | F | G | H | I | M | N | O | R |
| C | F | I | E | N | H | E | R | H | O | S | I | H | I | A | E | R | E | R | R | F |

The entry in the message row M is used as the row index in the quasigroup table and the entry in the key row C is used as the column index. For example, the first (M,E) pair, (A,A), indicates the second row, second column in the multiplication table. The ciphertext from this entry is F. The second pair, (*, E), indicates the first row, third column in the table. The entry there is I. Proceeding in this way until the last pair, (S,R), we see that the entry in row S, column R, is F.

At step 208, the sender sends the key (the row labeled E) and the ciphertext (the row labeled C.) This is received by the decrypting circuit at 210.

The receiver transforms the key using the ci-permutation, and then uses the ci-quasigroup to recover the message at 212.

This is shown in the following:

| E | A | E | F | G | H | I | M | N | O | R | A | E | F | G | H | I | M | N | O | R |
|---|---|---|---|---|---|---|---|---|---|---|---|---|---|---|---|---|---|---|---|---|
| B{E} | E | F | G | H | I | M | N | O | R | S | E | F | G | H | I | M | N | O | R | S |
| C | F | I | E | N | H | E | R | H | O | S | I | H | I | A | E | R | E | R | R | F |
| B{E}○C | A | * | M | E | S | S | A | G | E | * | F | O | R | * | A | G | E | N | T | S |

Here the π{E} row and the C row are used as indices in the ci-quasigroup table. For example, the pair of first entries in these two rows is {E, F}. The entry in row E and column F is A, the first letter of the message.

The sender, or in the case of a public key system, the public, has the multiplication table, or the rules for multiplication. For a large enough ci-quasigroup, however, finding the inverses of the ciphertext without the permutation can be the equivalent of searching the whole keyspace. For example, a 64 bit keyspace could require $2^{64}$ searches for each entry. Having the crossed inverse allows direct calculation of the message. As in most cipher systems, the difficulty of encipherment increases as the size of the key-space increases.

An Example of a Quasigroup with an Arithmetic Implementation

The example is presented only to illustrate the encryption/decryption calculations. As in other previously-described systems, this is not intended as a working system. It is far too small to be used in practical cryptography. The ci-quasigroup is constructed as follows: Two primes, p=3 and q=11 are chosen and the product, pq=33, is formed. The integers modulo 33 fall into two sets, those without 3 or 11 as factors and those that are multiples of 3 or 11 or both. The former set forms a group under multiplication modulo 33. For example 4 * 10=40 7 mod 33 while neither 3 nor 11 are factors of 4, 10, or 7. The 20 elements of this group are {1, 2, 4, 5, 7, 8, 10, 13, 14, 16, 17, 19, 20, 23, 25, 26, 28, 29, 31, 32}. The ci-quasigroup also has size 20, and consists of the numbers from 11 to 20, while its arithmetic is computed from a non-associative, non-commutative use of the arithmetic of the group. Two ci-quasigroup elements, (a,b), are mapped to the group by a function, Quasi2Group(x), described below. In the group, these elements $(Y_a, Y_b)$ are combined by the formula, $g_c = (g_a)^3 (g_b)^7$. Then $g_c$ is mapped back to the ci-quasigroup by a function c=Group2Quasi(gc).

The function, Group2Quasi(x), is simply $$Group2Quasi(x) = x - \left\lfloor \frac{x}{p} \right\rfloor - \left\lfloor \frac{x}{q} \right\rfloor$$

where the symbol, [x], indicates the integer part of a number.

A formula for the function Quasi2Group(x) is more cumbersome, but a simple algorithm for it as follows:

$$Let g^* = x + \left\lfloor \frac{x}{p-1} \right\rfloor + \left\lfloor \frac{x}{q-1} - 1. \right\rfloor$$

Then g*+δ for each δ=0, 1, and 2 is tested to see if x=Group2Quasi (g*+δ). Exactly one value of δ will succeed and the corresponding g* +δ will be the correct value of Quasi2Group(x). The following is the resulting multiplication table for the ci-quasigroup.

| 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 1 | 18 | 10 | 9 | 17 | 2 | 7 | 5 | 13 | 15 | 6 | 8 | 16 | 14 | 19 | 4 | 12 | 11 | 3 | 20 |
| 2 | 6 | 1 | 18 | 8 | 16 | 10 | 9 | 14 | 17 | 2 | 19 | 4 | 7 | 12 | 11 | 5 | 13 | 3 | 20 | 15 |
| 3 | 19 | 6 | 1 | 4 | 7 | 18 | 8 | 12 | 16 | 10 | 11 | 5 | 9 | 13 | 3 | 14 | 17 | 20 | 15 | 2 |
| 4 | 16 | 17 | 13 | 1 | 2 | 12 | 18 | 11 | 15 | 14 | 7 | 6 | 10 | 3 | 9 | 19 | 20 | 8 | 4 | 5 |
| 5 | 8 | 9 | 7 | 11 | 1 | 16 | 19 | 15 | 18 | 17 | 4 | 3 | 6 | 2 | 5 | 20 | 10 | 14 | 12 | 13 |
| 6 | 11 | 19 | 6 | 5 | 9 | 1 | 4 | 13 | 7 | 18 | 3 | 14 | 8 | 17 | 20 | 12 | 16 | 15 | 2 | 10 |
| 7 | 8 | 16 | 17 | 6 | 10 | 13 | 1 | 3 | 2 | 12 | 9 | 19 | 18 | 20 | 8 | 11 | 15 | 4 | 5 | 14 |
| 8 | 12 | 14 | 5 | 2 | 3 | 4 | 15 | 1 | 11 | 8 | 13 | 10 | 20 | 6 | 17 | 18 | 19 | 16 | 7 | 0 |
| 9 | 4 | 8 | 9 | 3 | 6 | 7 | 11 | 2 | 1 | 16 | 5 | 20 | 19 | 10 | 14 | 15 | 18 | 12 | 13 | 17 |
| 10 | 3 | 11 | 19 | 14 | 8 | 6 | 5 | 17 | 9 | 1 | 20 | 12 | 4 | 16 | 15 | 13 | 7 | 2 | 10 | 18 |
| 11 | 18 | 10 | 2 | 7 | 13 | 15 | 16 | 4 | 12 | 20 | 1 | 9 | 17 | 5 | 6 | 8 | 14 | 19 | 11 | 3 |
| 12 | 17 | 13 | 12 | 18 | 15 | 14 | 10 | 19 | 20 | 5 | 16 | 1 | 2 | 11 | 7 | 6 | 3 | 9 | 8 | 4 |
| 13 | 9 | 7 | 16 | 19 | 18 | 17 | 6 | 20 | 10 | 13 | 8 | 11 | 1 | 15 | 4 | 3 | 2 | 5 | 14 | 12 |
| 14 | 14 | 5 | 4 | 15 | 11 | 8 | 20 | 18 | 19 | 9 | 12 | 2 | 3 | 1 | 13 | 10 | 6 | 17 | 16 | 7 |
| 15 | 10 | 2 | 15 | 16 | 12 | 20 | 17 | 8 | 14 | 3 | 18 | 11 | 1 | 15 | 4 | 3 | 2 | 5 | 14 | 11 |
| 16 | 13 | 12 | 14 | 10 | 20 | 5 | 2 | 6 | 3 | 4 | 17 | 18 | 15 | 19 | 16 | 1 | 11 | 7 | 9 | 8 |
| 17 | 5 | 4 | 8 | 20 | 19 | 9 | 3 | 10 | 6 | 7 | 14 | 15 | 11 | 18 | 12 | 2 | 1 | 13 | 17 | 16 |
| 18 | 2 | 15 | 20 | 17 | 14 | 2 | 13 | 9 | 5 | 11 | 10 | 16 | 12 | 8 | 18 | 7 | 4 | 1 | 6 | 19 |
| 19 | 15 | 20 | 3 | 13 | 5 | 11 | 12 | 7 | 4 | 19 | 2 | 17 | 14 | 9 | 10 | 16 | 8 | 18 | 1 | 6 |
| 20 | 20 | 3 | 11 | 12 | 4 | 19 | 14 | 16 | 8 | 6 | 15 | 13 | 5 | 7 | 2 | 17 | 9 | 10 | 18 | 1 |

The ci-permutation for this quasigroup is obtained by mapping the elements to the group, raising to the 17 power and mapping back to the ci-quasigroup. The table for this permutation is

| a | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| π(a) | 1 | 18 | 10 | 9 | 17 | 2 | 7 | 5 | 13 | 15 | 6 | 8 | 16 | 14 | 19 | 4 | 12 | 11 | 3 | 20 |

SAMPLE CALCULATION

Encipherment proceeds as follows. Suppose a message component is M=3 and the corresponding key component is K=2. The ciphertext component is C=3 ∘2. Begin by determining the group elements corresponding to 3 and 2. For 3, g*=3 and it is found that δ=1. For 2, g*=2 and δ=0. So the group elements are 4 and 2. Next compute $4^3$ mod 33=31 and $2^7$ mod 33=29. Multiplying 31∘28 mod 33=8. Finally Group2Quasi (8)=8−[8/3] −[8/11] =8−2=6 The result is 3 ∘2=6 and the ciphertext component is C=6.

The decipherment proceeds as follows. The computation is π(K)∘C, where K=2 and C=6. To compute π(K), map K to Quasi2Group(K)=a=2, and compute $a^{17}$ mod 33=29. Then π(K)=Group2Quasi(29)=18 and the decipherment is 18∘6, which can be computed using the above algorithm and yields 3, the original value of M.

Iterative Encipherment

Unlike most cipher systems, the difficulty of decipherment increases geometrically when two iterative arithmetic operations are used. This is, in fact, an important advantage of this system when it is used in interactive encipherment. In this method, several encipherment keys are used: $E_1$, $E_2$, $E_3$ . . . The ciphertext is produced as a product, C=( . . . (((M $\circ E_1$) $\circ E_2$) $\circ E_3$) . . .

Figure 3:
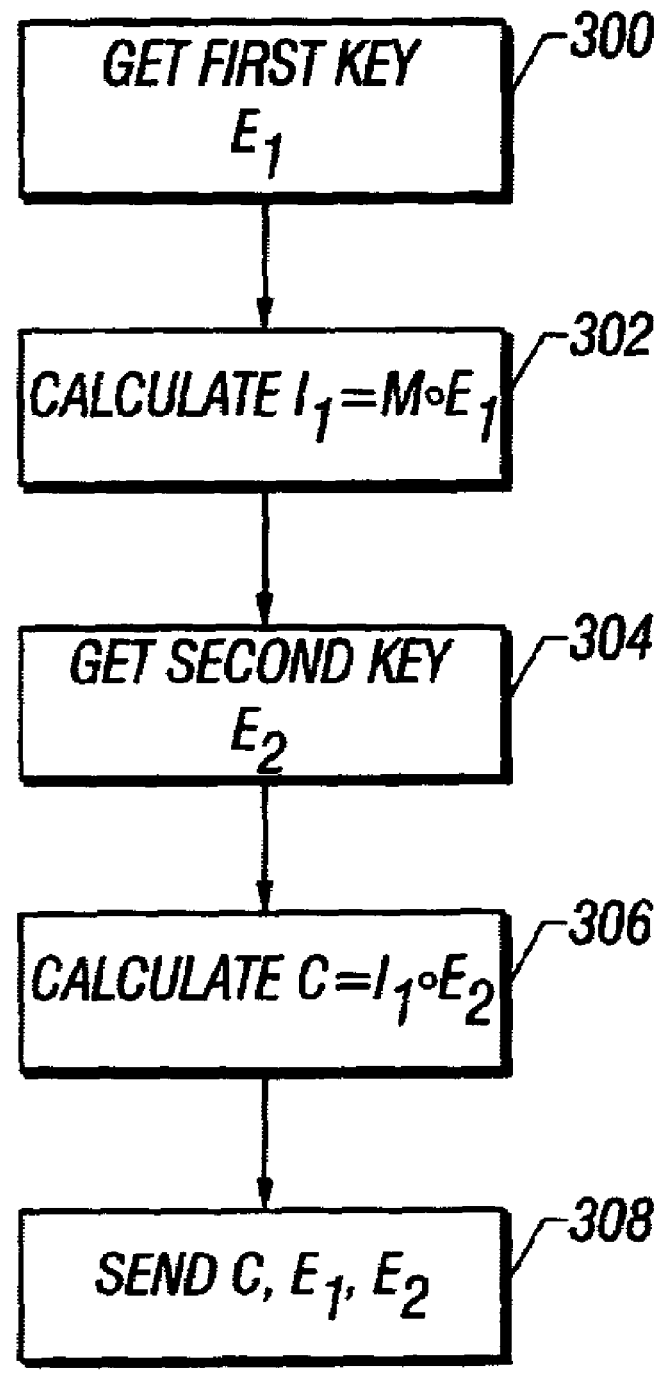
FIG. 3 shows a flowchart for double encryption using a disclosed mode.

The operation is shown in FIG. 3 which shows the simplest case, C=($M_1 \circ E_1$)$\circ E_2$. The flowchart of FIG. 3 shows getting the first key $E_1$ at 300. An interim$_{13}$ result$_{13}$ 1, is calculated at 302 as $I_1$=M $\circ E_1$. The second key $E_2$ is obtained at 304. The ciphertext C is calculated as C=$I_1$ $\circ E_2$. The ciphertext C, $E_1$ and $E_2$ are all sent at 308.

Since the quasigroup is not associative, in general (M $\circ E_1$) $\circ E_2 \neq$ M $\circ (E_1 \circ E_2)$. Indeed, in general there will be no $E^1$ such that M $\circ E^1$ =(M $\circ E_1$} $\circ E_2$.

That is, there is no single element which can take the place of the iterated multiplication. This is the opposite of several existing public key systems. For example, in the RSA system, if $E_1$ is used to encipher M and the result is again enciphered using $E_2$ the result is the same as a single encipherment using the product $E_1$ $\circ E_2$.

Iterative encipherment with ci-quasigroups, increases exponentially the number of mappings or permutations from "message space" to "cipher space". Therefore using 3 encipherments of key size 32 sequentially produces the equivalent of enciphering with a key size of $32^3$=32,768 elements.

Successive iterations can also change direction-left to right versus right to left. That is, an encipherment involving a left quasi-inverse can be followed by an encipherment involving a right quasi-inverse. A standard technique for decrypting a double encipherment, called the "meet in the middle" approach, is rendered impossible by this direction-changing encipherment with ci-quasigroups.

In a non-associative system, there is a plurality of inequivalent ways to insert parentheses in a product of three or more factors, and this can also be part of the key. For example, if "$\circ$" is the operation in a non-group quasigroup, a$\circ$(b$\circ$c)$\neq$(a$\circ$b)$\circ$c for some choices of a, b, and c in the quasigroup, and all five of (a$\circ$b)$\circ$(c$\circ$d), a$\circ$(b$\circ$(c$\circ$d)), ((a$\circ$b)$\circ$c)$\circ$d, (a$\circ$(b$\circ$c))$\circ$d, and a$\circ$((b$\circ$c)$\circ$d) might be different elements of the quasigroup. (In a system with an associative operation "$\circ$", such as a group, all five of these would necessarily be the same.) With five "factors", there are fourteen different ways to insert parentheses into a $\circ$ b $\circ$ c $\circ$ d $\circ$ e, which might all yield different answers in a non-group quasigroup. The number of different ways to insert parentheses in a "product" of K factors in a non-associative system grows exponentially with K, following the sequence 1, 1, 2, 5, 14, 42, 132, . . . of the so-called Catalan numbers.

BLOCK CIPHER APPLICATIONS

Another embodiment uses ci-quasigroups for block cipher applications.

In the case of block ciphers, each user uses the intended recipient's "encipherment element", which is used to one-sidedly multiply the plaintext block to produce the ciphertext block. The decoder then uses the quasi-inverse of that enciphering elements (one for each user), but only his own deciphering element (the quasi-inverse of his enciphering element).

A block cipher is a function of a message and a key which produces ciphertext and for which an inverse function exists:

C=f(M, K) (the encryption);

M=$f_{inv}$(C, K) (the decryption).

For transmission in the opposite direction, the roles of f and $f_{inv}$ are reversed. In these applications, unlike "public key" systems, the key, K, is secret, known only to the sender and recipient. The sender and recipient can decode one another's messages, but no one without the key can do so.

To use a ci-quasigroup as a block cipher, we take f(M,K)=M $\circ$ K (the encryption);

and $f_{inv}$(C,K)=B(K)$\circ$C (the decryption).

The fact that the sender uses K and the recipient uses B(K) gives added security. If an agent steals one of these keys, he can decode messages in one direction only.

Before the invention of public key systems, the great majority of cryptographic cipher systems used block ciphers, and many block ciphers are still in use. Most commonly, these "traditional" systems calculate C=M+K, where the "addition" operation, symbolized by the plus sign, is performed in an algebra which is both associative and commutative.

The cryptanalyst's task is rendered considerably more difficult in the system of FIG. 4, where C=M$\circ$K indicates an operation performed in a ci-quasigroup which is neither associative nor commutative.

Although only a few embodiments have been described in detail above, other embodiments are contemplated by the inventor and are intended to be encompassed within the following claims. In addition, other modifications are contemplated and are also intended to be covered.

OTHER UNCONVENTIONAL ALGEBRAIC SYSTEMS

The above disclosure has emphasized the use of quasigroups, and especially ci-quasigroups, for applications to cryptology. However, unconventional algebraic systems with two operations such as neo-fields and near-rings, can similarly be used to advantage in cryptographic system.

In a field, the elements form a commutative group with respect to a first operation, called "addition". If the zero element is removed, the remaining elements form a commutative group with respect to a second operation, called "multiplication". This is the conventional arithmetic that underlies almost all the cryptographic systems currently in use. In a neo-field, the two commutative groups of a field are replaced by quasi-groups. If one of these quasigroups is a ci-quasigroup, the neofield is called an xip-neofield. Encryption schemes even more elaborate that those already described, but using the same principles, can be based on xip-neofields.

In a ring, the elements form a commutative group with respect to a first operation "+", called "addition"; and the second operation "×", called "multiplication", satisfies closure: a×b is in the ring for all a and b in the ring. It satisfies associativity: a x(b×c)=a x(b×c) for all a, b, c in the ring. It also satisfies the two distributed rules with respect to addition: a x(b+c)=(a×b)+(a×c) and (a+b)×c=(a×c)+(b×c). (Every field is a ring but not every ring is a field. A neo-field, in general, will not be a ring, because both operations in a ring must be associative.)

A near-ring satisfies the requirements for a ring except that the elements may form a non-commutative group with respect to "+", and only one of the two distributive rules is required. Since the arithmetic in almost all widely used cryptographic systems is based on rings, the use of near-ring arithmetic brings a significant degree of unfamiliarity to cryptography. Moreover, all the advantages of non-commutativity discussed in connection with non-group quasigroups are also present. Although both operations, "+" and "x", in a near-ring are associative, neither of them need be commutative. (In the three most commonly used algebraic systems in contemporary cryptography, finite fields, modular arithmetic, and elliptic curves, both arithmetic operations are commutative.) Hence, one operation can use encryption with non-commutative arithmetic.

OTHER CRYPTOLOGIC APPLICATIONS

Although the cryptologic application of the present invention which has been discussed and illustrated in the greatest detail is to the encipherment of messages, the techniques disclosed are equally applicable to encryption and decryption of all other forms of information, including for example for use in identification, verification, and authorization.

Identification is the process of determining that someone is who he/she claims to be, prior to granting that person access to information or to a physical location. (PINs and passwords are simple examples of identifications).

Verification is the process of determining that something, such as a signature, a document, or a physical object, is genuine. ("Digital signature" is an important special case).

Authorization is the process of determining that a prospective user (e.g. of a proprietary computer program, or of a satellite television channel) meets the requirements for use (e.g. by having paid a fee, or signed up for a service, or by having a sufficiently high position in an appropriate organization).

With the steadily increasing importance of electronic commerce, the applications of cryptography other than to encrypting messages are rapidly gaining in economic significance. These include, for example, digital signatures, digital fingerprints, zero knowledge proofs, dynamic passwords, and access control, for example. These cryptographic techniques can be used for these other applications.

What is claimed is:

1. A computer implemented cryptography method, comprising:
   determining information M to be encrypted; and
   encrypting said information to form encrypted information using a non-trivial ci-quasigroup as a key K to create a cipher C indicative of the information M as C=M*K, where * denotes a mathematical operation, where the non-trivial ci-quasigroup has properties that for the operation *, between any two elements in the non-trivial ci-quasigroup, a result of the operation is also in the non-trivial ci-quasigroup and for every K, as M takes in a different value, resulting value of C are each distinct, for every M, as K takes on all key values, the resulting values of C, are all distinct; and that each key K in a keyspace P has a permutation $K^{-1}$ that decodes the encrypting, such that $K^{-1}*(M*a)=M$.

2. A method as in claim 1, further comprising decoding said information using a crossed-inverse function of said non-trivial ci-quasigroup.

3. A method as in claim 1, wherein said encrypting comprises carrying out a first encryption to get a first result, then carrying out a second encryption using said first result, and iterating said encryption an arbitrary number of times.

4. A method as in claim 1 further comprising defining a rule indicative of said non-trivial ci-quasigroup.

5. A method as in claim 2 further comprising defining a rule indicative of said crossed inverse function of said quasigroup.

6. A method as in claim 1 further comprising carrying out a second encrypting using said mathematical operation, and wherein a result of said second encryption is encrypted exponentially more than a result of a first encryption.

7. A method as in claim 1 wherein said encrypting comprises using a non trivial non-group crossed inverse quasigroup to encode.

8. A method as in claim 2 further comprising distributing information indicative of said non-trivial ci-quasigroup as a public key, and keeping secret the non-trivial ciquasigroup.

9. A method as in claim 1 wherein said quasigroup is formed by an n by n square, where n is greater than $10^{10}$.

10. A method as in claim 3 wherein said first and second encryption form iterative encipherment.

11. A method as in claim 3 wherein a first interation is carried out in a different direction than said first encryption.

12. A method as in claim 11 wherein a first direction of said first iteration is left to right and said different direction is right to left.

13. A method as in claim 1 wherein said encrypting is carried out using block ciphers.

14. A method as in claim 13 wherein said block cipher are defined by a function.

15. A method as in claim 13 wherein said block ciphers are formed using cross inversed quasigroups, used according to C=f(M, K) for the encryption and M=finv(C,K) for a decryption.

16. A computer implemented cryptography method, comprising:
   determining information to be encrpted; and
   encrypting said information M to form encrpyted information using a Key K which is a crossed-inverse quasigroup to create a cipher C as C=M*K, where * denotes a mathematical operation, where the quasigroup has properties that for the operation *, between any two elements in the quasigroup, a result of the operation is also in the quasigroup, and for every K, as M takes on different values, resulting values of the cipher C, are each distinct, for every M, as K takes on all key values, the resulting values of the cipher C, are all distinct; and that each key K in a keyspace P has a permutation $K^{-1}$ that decodes the encrypting, such that $K^{-1}*(M*a)=M$.

17. A method as in claim 16, further comprising decoding using a crossed inverse of said quasigroup.

18. A method as in claim 1, wherein said encrypting comprises carrying out a first encryption to get a first result, then carrying out a second encryption using said first result.

19. A cryptography method comprising encrypting information using an airthmetic with an algebraic structure, said albegraic structure being a non-group, nonfield structure.

20. A method as in claim 19 wherein said algebraic structure is not associative.

21. A method as in claim 19 wherein said algebraic structure is not associate.

22. A method as in claim 20 wherein said algebraic structure is not commutative.

23. An apparatus comprising a program stored on a computer readable media including instructions to:
   encrypt a message M into an encrypted message_using a key K indicative of a crossed-inverse quasigroup representation, where the quasi has properties that for a operation *, between any two elements in the quasigroup, a result of the operation is also in the quasigroup, and for every K, as M takes on message values, resulting values of a cipher C, where C=M*K are each distinct, for every M, as K takes on all key values, resulting values of the cipher C, are all distinct; and each key K in a keyspace P has a permutation $K^{-1}$ that decodes the encrypting, such that $K^{-1}*(M*a)=M$;

send the encrypted message C; and decrypt the encrypted_message using information indicative of the same crossed-inverse quasigroup representation.

24. An apparatus as in claim 23, wherein said operation is one which is based on a multiplication table which is expressed as a rule.

25. An apparatus as in claim 23, further comprising adding a random seed to said arithmetic.

26. An apparatus as in claim 23, further comprising using an additional encryption to provide an effective key size of $x^2$ of an original encryption.

27. A method as in claim 1, further comprising sending the encrypted information as a message.

28. A method as in claim 16, further comprising sending the encrypted information as a message.

* * * * *